INVENTOR:
PAUL E. WIBLE JR.

United States Patent Office 2,758,286
Patented Aug. 7, 1956

2,758,286

VOLTAGE REGULATED ALTERNATING CURRENT FILTER

Paul E. Wible, Jr., Sullivan, Ind.

Application March 24, 1952, Serial No. 278,285

6 Claims. (Cl. 333—70)

(Granted under Title 35, U. S. Code (1952), sec. 266)

This invention in general relates to a power supply system and, more particularly, relates to an electrical filter system for use with an amplitude regulated alternating current power source having distortion components in the sinusoidal output thereof.

It is not uncommon in electrical systems to find a requirement that there be a source of sinusoidal voltage of constant magnitude and of a substantially pure sinusoidal wave form. When distortion is caused by harmonics of the fundamental frequency of a constant and a continuing nature, it is not too difficult to regulate amplitude of the output voltage of such a power source, but it is very troublesome to readily filter out these harmonics without interfering with the regulation of the system. Thus, for example, if such a regulated power source were connected to a given load device and a conventional filter circuit to remove these harmonics were inserted in series or parallel with the load, any change in load current would automatically affect the regulation of the system due to the varying voltage drop of the fundamental across the filter circuit.

Another disadvantage found in prior A. C. power supply filter circuits is that these circuits are sensitive to small temperature or frequency variations.

Accordingly, one object of the instant invention is to provide a means for filtering out the distortion components from an amplitude regulated alternating current voltage source without affecting the regulation thereof when attached to a varying load.

Another object of the instant invention is to provide a filter circuit means for use with a voltage regulated alternating current power source which is not sensitive to small temperature or frequency variations.

Still another object of the instant invention is to provide an electrical filter circuit for insertion in series with a voltage regulated alternating current power source and a load to be supplied thereby which does not consume much power or voltage drop from the power source.

Broadly, the instant invention comprises an A. C. power supply system including a first filter coupled across the load which passes only the distortion components appearing thereacross, a means for amplifying the output of the filter and inserting the voltage in the output thereof in series with the power supply and load, a second filter circuit means connected to the output of the amplifier to detect the presence of only the fundamental voltage component in the output of the amplifier, and a means for feeding the output of this second filter to the input of the amplifying means thereby causing a voltage to appear in the output thereof tending to cancel the latter fundamental voltage component.

Other objects and features of the instant invention will become apparent upon making references to the specifications to follow and the drawings wherein like reference numerals indicate the same components:

Figure 1:
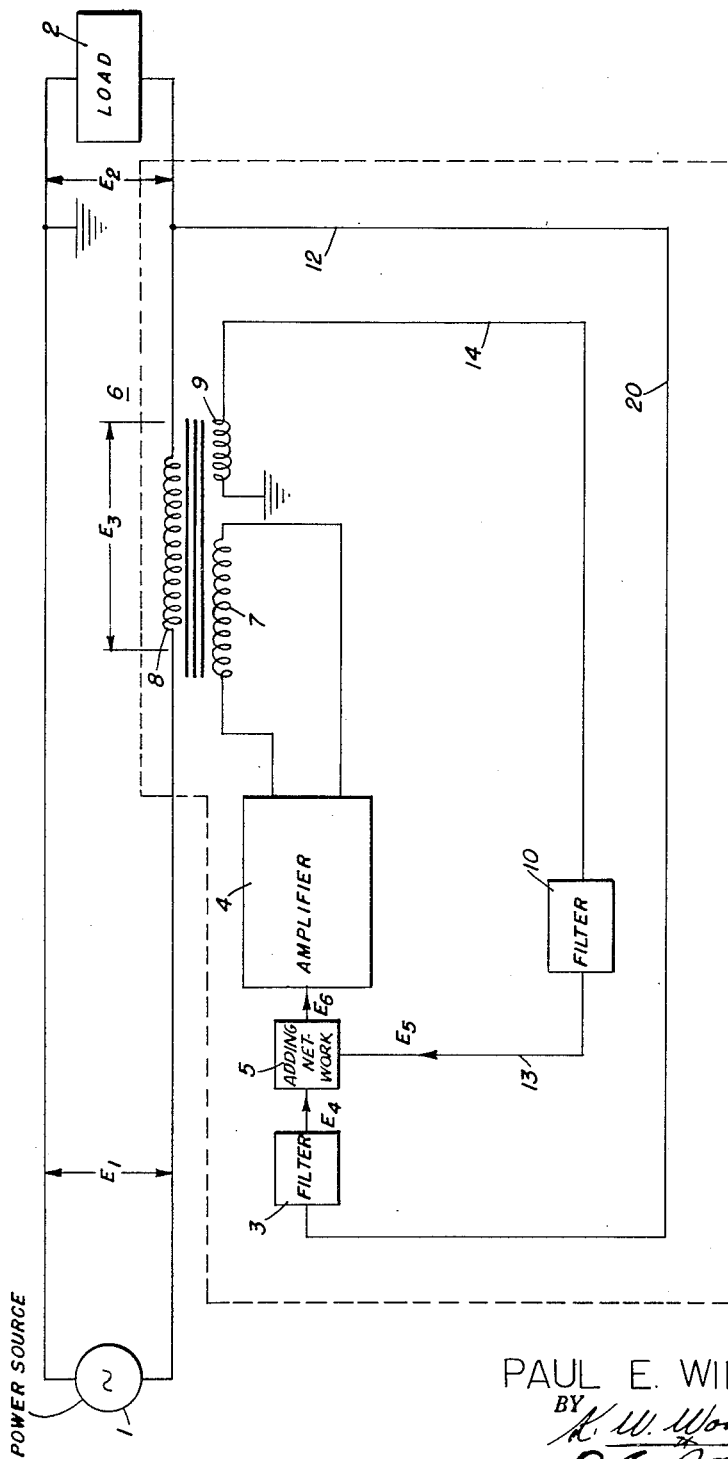
Figure 1 is a simplified electrical diagram of the instant invention.

Referring now more particularly to Figure 1, enclosed in dotted lines is a filter circuit which is inserted in series between a source of alternating current voltage 1 delivering a fundamental voltage having distortion components therein, and a load 2. The purpose of the filter circuit is to remove the distortion components from the output voltage $E_1$ of power source 1 so that a voltage $E_2$ appears across the load 2 which is constant and has substantially the same magnitude as the fundamental voltage output of power source 1 and substantially free of any distortion components.

To cancel out the distortion components which might appear across load 2, a first filter network 3 is coupled across the load 2 which filters out only the fundamental voltage component thereby providing a voltage $E_4$ in the output thereof consisting of the distortion components. The output of first filter network 3 is fed to an amplifying device 4 through coupling network 5, the function of which will be described later. The output circuit of amplifier 4 comprises a transformer 6 having three windings; namely, a first winding 7 across which the output of the amplifier directly appears, a second winding 8 magnetically coupled to winding 7 which is connected directly in series between the power source 1 and load 2, and a third winding 9 magnetically coupled to windings 7 and 8. The voltage $E_3$ which appears across winding 8 includes an induced voltage from winding 7, and a voltage originating directly from power source 1. Part of the voltage induced from winding 7 from transformer 6 is a distortion voltage component which is made of such magnitude as to tend to cancel out the distortion component appearing in the source voltage. Also induced in winding 8 from winding 7 is a voltage having a fundamental component which is obtained from the output of a second filter circuit network 10, the input of which is coupled to transformer winding 9. Filter network 10 is designed to filter out all frequencies except the fundamental voltage component of power source 1. The fundamental voltage $E_5$ appearing across the filter nework 10 is fed to coupling network 5 which is an adding network which provides a voltage $E_6$ in the output thereof which includes the distortion component output of filter network 3 and any component of the fundamental voltage filter 3 did not remove, together with the fundamental voltages output of filter 10 which tends to cancel any of the fundamental voltage components appearing in the output of filter 3. Thus the fundamental voltage component appearing across winding 7 of transformer 6 in the output of amplifier 4 is induced into winding 8 and tends to cancel any fundamental voltage drop appearing thereacross due either to the variations in the load which effect the voltage drop across wiring 8, or to the effects on the filter circuit of frequency variations in the fundamental voltage. In effect, the circuit just described including transformer winding 9, filter 10, and amplifier 4 is a feedback network which provides a voltage of proper phase tending to cancel out any fundamental voltage drop appearing across winding 8 of transformer 6. If the load current in load 2 should suddenly increase in value, then the larger voltage drop, which would tend to appear across transformer winding 8, is substantially cancelled out by the increased fundamental component voltage fed thereto from winding 7 in the output of amplifier 4.

One important advantage of the circuit just described is that it is a self-compensating system in that, should the characteristics of filter network 3 vary due to any temperature variation or aging effects, any fundamental voltage introduced across winding 8 from the fundamental voltage appearing in the output of filter 3 will be appreciably reduced by the increased fundamental voltage $E_5$ appearing in the output filter network 10. Because of the sensitivity of the system, without the compensating feedback network which includes transformer winding 9 and filter 10, even a small component of the fundamental voltage appearing in the output of filter network 3 would cause a very appreciable change in the fundamental voltage appearing across load 2. Such effects would occur due to small frequency changes in power source 1 which would reduce the efficiency of filter 3 in removing such a varying fundamental component and would appreciably change the amplitude of the voltage appearing across load 2 if it were not for the network just described.

Figure 2:
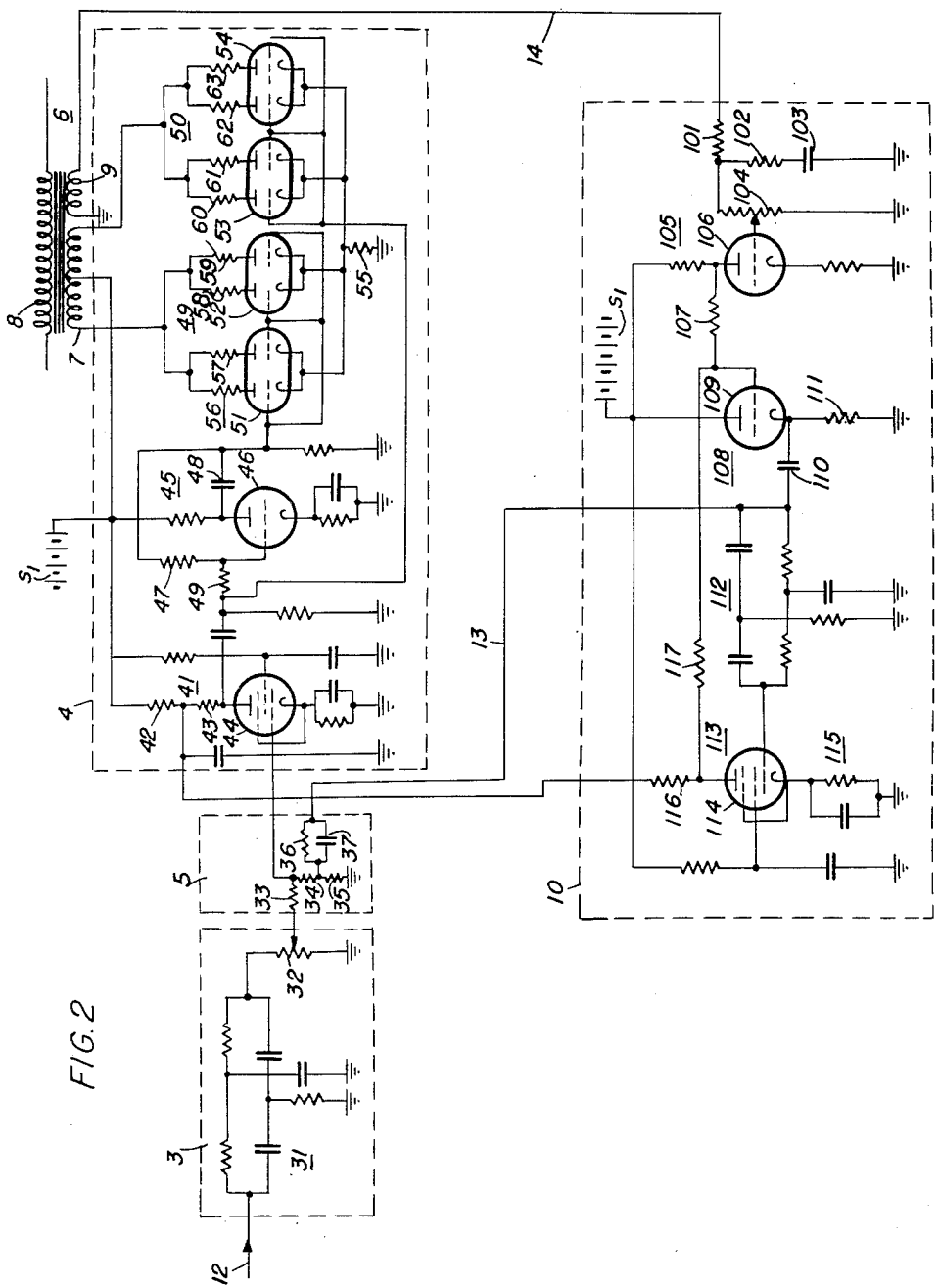
Figure 2 is a more detailed circuit diagram of part of a system shown in Figure 1.

Refer now more particularly to Figure 2 which shows circuit details of filter circuits 10 and 3, adding circuit 5, and amplifier 4. A conductor 12 is connected from one of the load terminals to the input of filter 3. Filter 3 comprises a double-T-type capacity resistance network such as disclosed in U. S. Patent 2,372,419 to Ford et al., and a potentiometer 32 connected to the output of the latter network. The output of filter 3 is taken between the movable contact of potentiometer 32 and the ground terminal so that the voltage output thereof is adjustable in order to provide a bucking voltage across winding 8 of transformer 6 of sufficient magnitude to cancel out the distortion components originating in power source 1. The movable contact of potentiometer 32 is coupled to the adding circuit 5 which comprises a resistance 33 connected to the movable contact potentiometer 32 and a pair of resistances 34—35 connected from resistance 33 to the ground. The junction of resistances 33 and 34 is connected to the grid of a vacuum tube 44 which is the first stage of amplifier 4. The output voltage of filter circuit 10, which comprises the fundamental voltage component, is fed to the junction of resistances 34 and 35 through a coupling circuit which includes resistance 36 and parallel with capacitor 37. The values of impedances which may be used for the adding circuit are as follows:

Potentiometer 32=2 megohms
Resistance 33=300,000 ohms
Resistance 34=300,000 ohms
Resistance 35=47,000 ohms
Resistance 36=270,000 ohms
Capacitor 37=.003 $\mu\mu f$.

A conductor 14 couples with the outputs of transformer winding 9 to the input of filter network 10. Filter circuit 10 comprises a feedback-type filter wherein the distortion frequency components to be filtered out are passed through a double-T-type filter 112 similar to filter network 31. The output of filter 112 is amplified in an amplifier stage 113 which feeds a voltage back into the input of filter 112 which tends to cancel out any distortion component in the input. The voltage on a conductor 13 connected to the input of filter 112 comprises substantially pure fundamental voltage component. The purpose of this kind of circuit is to provide a compensating circuit wherein if the response characteristics of filter 112 relative to the fundamental component were to vary due to any temperature or frequency variations, the amplifier stage 113 coupled to the output thereof would feed a correction voltage back to the input of filter 112 tending to cancel out an error voltage component caused by such variations. This self-compensating feature of filter 10 is in a general sense applied to the entire filter system as previously mentioned.

The circuit details of filter 10 include an input circuit fed by conductor 14 comprising a resistance 101 in series with a parallel impedance combination of a potentiometer 104 and a series circuit of a resistance 102 and a capacitor 103. The function of resistances 101 and 102 and capacitor 103 is to provide stabilization against oscillation at low frequencies of the feedback loop composed of adding network 5, amplifier 4, transformer 6, and filter 10.

The values of the impedance which may be used for the input circuit to filter circuit 10 assuming power source 1 has a fundamental frequency of 400 cycles per second is as follows:

$R_{101}$=67,000 ohms
$R_{102}$=17,000 ohms
$R_{104}$=200,000 ohms
$C_{103}$=.47 microfarad One function of potentiometer 104 is to provide a variable adjustment to the fundamental voltage component which is present in the input to the amplifier 4 so that it provides a voltage of sufficient magnitude to sufficiently cancel out the fundamental voltage drop present across winding 8 of transformer 6.

The output of potentiometer 104 is coupled to the input of a conventional amplifier stage 105 which includes a vacuum tube 106. The output of amplifier stage 105 is directly coupled to the grid circuit of the vacuum tube in a succeeding conventional cathode follower stage 108 through a coupling resistance 107. The reason for the direct current coupling to the cathode stage 108 is to reduce low frequency phase shift and the tendency resulting for low frequency oscillation of filter 10. The output of cathode follower stage 108 is coupled from the cathode impedance 111 through capacitor 110 to the input of filter network 112. As previously stated, filter network 112 is adapted to filter out the fundamental voltage and pass the distortion components to the input of amplifier 113. Amplifier stage 113 comprises a conventional resistance-capacitance biasing network 115 in the cathode circuit thereof and a plate load resistance 116 which joins the low voltage side of resistance-capacitance decoupling network shown in the plate circuit of tube 44.

A direct coupling from the low voltage side of the plate resistance 116 is made to the input of cathode follower stage 108 through a resistance 117. The purpose of this feedback circuit is to provide a voltage in the input circuit to filter network 112 which tends to cancel out the distortion components fed to the same point directly from transformer winding 9. Thus the voltage fed by conductor 13, which is connected to the input of filter network 112, has a substantially pure sinusoidal waveform of the fundamental frequency of power source 1.

The output of adding circuit 5, which includes both fundamental and distortion components, is fed to the control grid of a vacuum tube 44 in the first stage 41 of amplifier 4. (The plate load impedance of tube 44 includes resistance 43 leading to the direct current voltage supply of the amplifier.) The output of amplifier stage 41 is coupled through a conventional capacitive coupling circuit to the input of second amplifier stage 45. The output of amplifier stage 45 is coupled through capacitor 48 to the input of succeeding stage 49 and also by means of a feedback circuit including a resistance 47 to the input of stage 45. In the actual electrical design of a filter of the type described herein, it is necessary that stages 49 and 50 meet the following conditions when operating in conventional push-pull:

a. That stages 49 and 50 be capable of conducting the A. C. line current in winding 8 of transformer 6 reflected into winding 7 of transformer 6 without the sum of the D. C. and A. C. plate dissipation of any individual tube exceeding the rated maximum of any individual tube;

b. That sufficient voltage be developed across winding 8 of transformer 6 to buck out harmonics present in the voltage to be filtered and still have stages 49 and 50 operating as class A amplifiers; and c. That instantaneous plate voltage of stages 49 and 50 shall not be less than zero.

Transformer 6 is preferably an iron cored transformer and in order to prevent direct current saturation thereof, direct current for the vacuum tube circuits in which transformer 6 is directly associated is made to flow in opposite directions therethrough. To this end, a center tap on winding 7 connects directly to the positive terminal of a direct energizing voltage source $S_1$, and the outer terminals thereof are connected respectively to the plate circuits of a first amplifying circuit 49 and a second amplifying circuit 50. Amplifying circuit 49 includes a first double triode tube 51. Respective plates of triode tube 51 connect to the left terminal of winding 7 through similar plate resistances 56 and 57. A second double triode tube 52 also has its plates connected to the left terminal of winding 7 through similar plate load resistances 58 and 59. All of the grids of tubes in the circuit 49 are connected to the plate circuit of the prior amplifier stage 45. A second amplifying circuit 50 comprises a first double triode tube 53 having its respective plates connected to the right terminal of winding 7 through respective resistances 60 and 61, and a second double triode tube 54 having its respective plates connected to the latter joint through respective resistances 62 and 63. In order to provide a push-pull operation of circuits 49 and 50, the grids of the tubes in circuit 50 are connected to the input of amplifier stage 45 which provides a voltage which is 180° out of phase with the voltage supplied to the input of amplifier circuit 49. The cathode of all the tubes in circuits 49 and 50 are connected to ground through a common resistance 55. The reason for utilizing the plurality of electron tube discharge paths in circuit 49, each of which includes a plate load impedance, is that the number shown was the minimum required to meet the requirements of the application for which the circuit shown in Figure 2 was designed. If desired, all of the discharge paths of stages 49 and 50 could respectively be replaced by a single electron discharge path tube of suitable rating. (Circuits 49 and 50 are identical and the level of the voltage fed to the input of the circuits is nearly the same.)

A common amplifier for amplifying the outputs of filter circuits 3 and 10 is not necessary since separate amplifier stages could be used by each as long as the outputs of the amplifier were in common.

Many other modifications may be made of the preferred embodiments of the instant invention above described without deviating from the broader aspects of the invention.

The invention described herein may be manufactured and used by or for the Government of the United States of America for governmental purposes without payment of any royalties thereon or therefor.

I claim:

1. In an electrical system including a source of amplitude regulated alternating current voltage having a fundamental component and distortion components and a load supplied thereby, a filter circuit for providing for said load a substantially pure sinusoidal voltage unaffected in form by conditions in said load comprising a first filter circuit means having its input coupled to said load for filtering out the fundamental voltage component of the source voltage appearing thereacross, an amplifying means having its input coupled to the output of said first filter circuit means and its output in series with said voltage source and load to introduce a voltage tending to cancel out the distortion components appearing across said load, second filter circuit means for filtering out all voltage components except the fundamental voltage component having its input coupled to the output of said voltage source, means coupling the output of said second filter circuit means to the input of said amplifying means to introduce a fundamental component voltage in the output of said amplifier tending to cancel the fundamental voltage drop appearing across the finite impedance of the amplifier circuit.

2. In an electrical system including a source of amplitude regulated alternating current voltage having a fundamental component and distortion components and a load supplied thereby, a filter circuit for providing for said load a substantially pure sinusoidal voltage of constant amplitude comprising a first means inductively coupled to the system between the source and load for introducing voltages tending to cancel said distortion components, a second means interposed between the first means and a point between the first means and the load for sampling said source voltage, said second means including a means to remove the fundamental component of the source voltage while passing the distortion components, a third means inductively coupled to the first means for obtaining a sample of the fundamental component of the voltage across said first means including means to remove all but the fundamental component, a fourth means for combining the output of the second and third means, and an amplifier having its input coupled to the output of said fourth means for said combined output and its output connected to the input of said first means.

3. The combination of claim 1 characterized further by said second filter circuit means comprising an amplifier circuit having a filter in series with the input thereof for filtering out only the fundamental component, means coupled from the output of said amplifier to the input of said filter to cancel the distortion components in the input thereof, means coupling the input to said filter circuit to said amplifying means.

4. A filter circuit for a voltage source comprising a transformer having a first winding for connecting in series with a line from said source having a desirable frequency component, said transformer having a second and a third winding, a band stop filter having an input and an output, said input being connected to the side of the first winding remote from the source for sampling said source voltage, a band pass filter having an input and an output, said input of the band pass filter being connected to the third winding of the transformer to sample the voltage induced from said secondary winding, an adding network, said outputs of the band stop and band pass filters being connected to the adding network, an amplifier having its input connected to the adding network and its output connected across the second winding of said transformer, said band stop filter being operative to remove the desired frequency component from a voltage sample, said band pass filter being operative to sample the voltage output of the amplifier and to introduce into the adding network the desired frequency component in such a relation to any unfiltered component and to supply a desired frequency component amplified by said amplifier to compensate the circuit being filtered for any voltage loss resulting from reflected impedance of said filter.

5. A filter circuit for use with a voltage regulated power source comprising a primary circuit including a first transformer winding in series with said power source and the load to be supplied with power, a secondary circuit inductively coupled to said primary circuit, said secondary circuit including a second and third transformer winding inductively coupled to said first winding, a voltage amplifying means having input and output terminals, said second winding coupled to the output terminals of said amplifying means, first filter means coupled between said third winding and the input of said amplifying means for filtering out all voltages but the fundamental voltage of said power source in the output of said first filter means, a second filter means for filtering out only the fundamental voltage of said power source coupled between the load and said input of said amplifying means whereby the voltage across said load is free of distortion components.

6. A filter circuit for an alternating current voltage source having a desired fundamental frequency component for transmission to a load comprising a first filter of the band elimination type for removing the desired fundamental frequency component, said first filter having an input and an output, a second filter of the bandpass type for passing the desired fundamental frequency component, said second filter having an input and an output, an adding network connected to the outputs of the first and second filters for combining their outputs to cancel from the combination any component of the desired fundamental frequency appearing in the output of the first filter, an amplifier having an input and an output with its input connected to the adding network to amplify the combined outputs of the first and second filters, a first winding connected across the output of said amplifier, a second winding magnetically coupled to said first winding and connected in such phase relation to the input of said second filter that the desired fundamental frequency is coupled to said input of said second filter in phase with the desired fundamental frequency in the alternating current voltage source, a third winding having an input and an output terminal for serial connection in an alternating current line between an alternating current voltage source as an input to the filter circuit and a load as an output to the filter circuit, respectively, said third winding being magnetically coupled to said first and second windings, said input of said first filter being connected to said output terminal of said third winding.

References Cited in the file of this patent

UNITED STATES PATENTS

| | | |
|---|---|---|
| 1,773,772 | Berthold | Aug. 26, 1930 |
| 1,956,121 | Craig | Apr. 24, 1934 |
| 1,985,353 | Rhodes | Dec. 25, 1934 |
| 2,037,846 | Aikens | Apr. 21, 1936 |
| 2,154,020 | Young | Apr. 11, 1939 |
| 2,505,620 | John et al. | Apr. 25, 1950 |
| 2,591,955 | Mak et al. | Apr. 8, 1952 |